United States Patent [19]

Inoue et al.

[11] 4,452,819

[45] Jun. 5, 1984

[54] DISC COATING METHOD

[75] Inventors: Takao Inoue; Yukio Maeda; Masami Uchida, all of Hirakata, Japan

[73] Assignee: Matsushita Electric Industrial Co., Ltd., Japan

[21] Appl. No.: 413,064

[22] Filed: Aug. 30, 1982

[30] Foreign Application Priority Data

Sep. 8, 1981 [JP] Japan .................................. 56-142062

[51] Int. Cl.³ ............................................. B05D 3/06
[52] U.S. Cl. .................................... 427/54.1; 427/209; 427/346
[58] Field of Search ................. 427/44, 346, 240, 209, 427/54.1; 428/64-66

[56] References Cited

U.S. PATENT DOCUMENTS

| | | | |
|---|---|---|---|
| 3,104,983 | 9/1963 | Tarwater et al. | 117/93.31 |
| 3,730,760 | 5/1973 | Machmiller | 427/240 |
| 3,795,534 | 3/1974 | Mehalso et al. | 427/240 |

Primary Examiner—Bernard D. Pianalto
Attorney, Agent, or Firm—Wenderoth, Lind & Ponack

[57] ABSTRACT

A manufacturing method for an optical type recording and reproducing disc and the like, comprising the steps of, applying a coating liquid to opposite planar surfaces of the disc except for the central portions by rotating the disc, with the opposite planar surfaces of the disc being simultaneously dipped in the coating liquid, and thereafter, simultaneously curing the coating liquid applied to the opposite planar surfaces of the disc while rotating the disc.

20 Claims, 3 Drawing Figures

DISC COATING METHOD

BACKGROUND OF THE INVENTION

The present invention generally relates to a manufacturing method for an optical type recording and reproducing disc and more particularly, to a method of forming hard coating films on outer surfaces of discs.

In conventional optical type recording discs, it has been a general practice that after a process of forming a recording layer enabling optical recording and reproducing, on a plastic plate of a circular shape, has been completed, another plastic plates are attached to the recording layer as required so as to protect the recording layer against damage. However, the known optical type recording discs present an inconvenience in that the plastic plates for protecting the recording layer from damage also sustain flaws on the surfaces through contact with dust or improper materials during manufacture. The above described disadvantage also presents a serious problem to optical type recording and reproducing discs utilizing laser beams; namely the flaws produce noises in recording and reproducing signals.

In this connection, the present inventors have disclosed in U.S. patent application No. 174,600, filed Aug. 1, 1980 and U.S. patent application No. 247,085, filed Mar. 24, 1981 that coating compositions are coated and cured on the optical type recording and reproducing disc manufactured by a conventional method so as to form a transparent hard coating film which exhibits an outstanding effect for preventing flaws. However, the coating compositions disclosed in the above described U.S. Patent Applications have posed a new problem in that it is difficult to form a uniform coating film and application of the coating compositions to a one-sided coating disc obtained by the conventional horizontal spinner method causes the disc to be distorted. Furthermore, the above described coating compositions have a disadvantage in that when the disc is stopped temporarily after a spinner operation so that ultraviolet rays may be irradiated onto the coating film for curing thereof, a small difference in coating film thickness arises between peripheral portions and a central portion of the disc. More specifically, the coating compositions have been disadvantageous in that the disc having a large distortion or the cured coating film of greatly non-uniform thickness makes it difficult to maintain a constant clearance between a semiconductor laser element and the disc, so that it becomes impossible to perform recording and reproduction of signals, thus resulting in deterioration of performance of the disc.

SUMMARY OF THE INVENTION

Accordingly, an essential object of the present invention is to provide an improved disc coating method which restricts distortion of an optical type recording disc to a minimum and forms a hard coating film having a uniform thickness on the disc, with substantial elimination of the disadvantages inherent in conventional disc coating methods of this kind.

Another important object of the present invention is to provide an improved disc coating method as described above which is highly reliable in actual use and suitable for mass production at low cost.

In accomplishing these and other objects according to one preferred embodiment of the present invention, there is provided an improved disc coating method comprising the steps of: applying a coating liquid to opposite planar surfaces of a disc except for the central portions thereof by rotating said disc, with the opposite planar surfaces of said disc being simultaneously dipped in the coating liquid or poured with the coating liquid; and thereafter, simultaneously curing the coating liquid applied to the opposite planar surfaces of said disc, while rotating said disc.

In accordance with the present invention, the disc having both a minimum distortion and, a uniform thickness of the hard coating film can be obtained.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
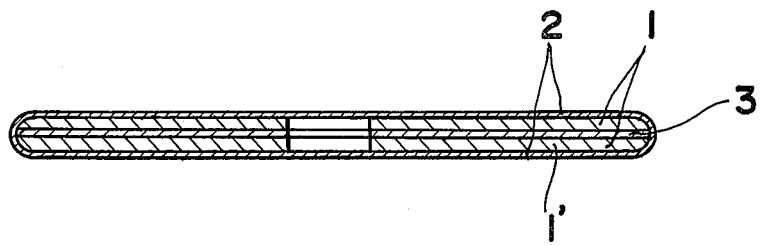
FIG. 1 is a cross-sectional view of a disc to which a disc coating method of the present invention has been applied.

Referring now to the drawings, there is shown in FIG. 1, an optical type recording and reproducing disc to which a disc coating method of the present invention has been applied. The disc comprises a base plate 1' and a hard cured coating film 2 coated on outer surfaces of the base plate 1'. The base plate 1' is composed of three layers, namely two plastic plates 1 and a recording layer 3 which is required for optical recording and reproducing and is interposed between the two plastic plates 1. Each of the plastic plates 1 is made of acrylic resin and the like and has a diameter of 210 mm with an opening being formed at a central portion thereof. More specifically, the recording layer 3 is designed to work on a principle that irradiation of a laser beam onto the recording layer 3 causes its phase transition so as to change its reflectance.

Figure 2:
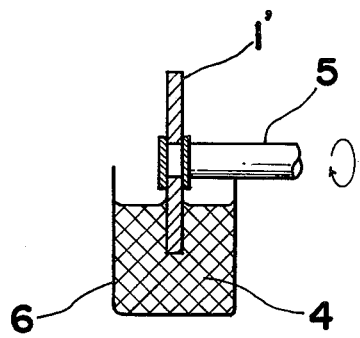
FIG. 2 is a view explanatory of application of coating liquid to opposite planar surfaces of the disc in one of the disc coating methods of the present invention.

Referring now to FIG. 2, there is shown one example of application of coating liquid 4 to the base plate 1' in the disc coating method of the present invention. After a dip tank 6 is filled with the coating liquid 4, the coating liquid 4 is applied to opposite planar surfaces of the base plate 1' simultaneously, with the base plate 1' being rotated by a rotary shaft 5.

Figure 3:
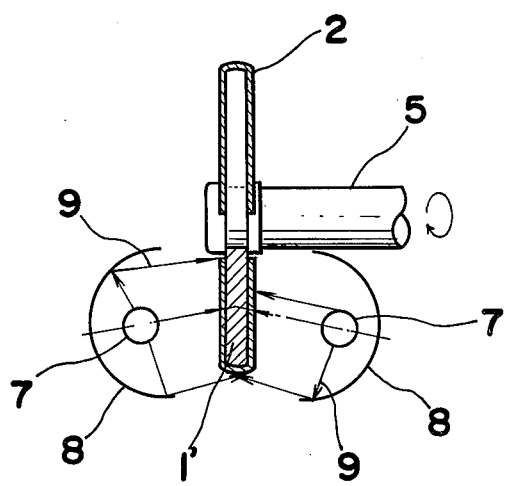
FIG. 3 is a view explanatory of curing of the coating liquid applied to the opposite planar surfaces of the disc in the disc coating method of the present invention.

Referring also to FIG. 3, there is shown one example of curing of the coating liquid 4 applied to the opposite planar surfaces of the base plate 1' in the disc coating method of the present invention. The coating liquid 4' applied to the opposite planar surfaces of the base plate 1' is simultaneously cured by ultraviolet rays 9 radiated from two ultraviolet lamps 7 and two reflecting mirrors 8 while rotating the base plate 1' by the rotary shaft 5 used also for applying the coating liquid 4 to the base plate 1' such that one of the two ultraviolet lamps 7 and one of the two reflecting mirrors 8 are disposed at the side of one planar surface of the base plate 1', with the other one of the two ultraviolet lamps 7 and the other one of the two reflecting mirrors 8 being disposed at the side of the other planar surface of the base plate 1'.

More specifically, it is desirable that rotational speed of the rotary shaft 5 should be 200 rpm or less during application of the coating liquid 4 to the base plate 1'. In the case where the rotational speed of the rotary shaft 5 exceeds 200 rpm at that time, bubbles or foams are formed in the coating liquid 4 in the dip tank 6 during application of the coating liquid 4 to the base plate 1', so that pin-holes are formed in the hard cured coating film 2 or the coating liquid 4 applied to the base plate 1' is splashed. Thereafter, the base plate 1' is spaced from the coating liquid 4 in the dip tank 6 after it has been dipped in the coating liquid 4. Then, the base plate 1' should be rotated at speeds of between 200 and 6,000 rpm, more preferably of between 1,000 and 2,000 rpm as a spinner operation so as to obtain an excellent coating film having a uniform thickness. Then, in order to obtain the hard cured coating film 2, ultraviolet rays 9 are irradiated onto the coating liquid 4 applied to the base plate 1' as described above.

Although curing conditions of the coating liquid 4 vary according to the capacity of the ultraviolet lamp 7, a distance between each of the ultraviolet lamps 7 and corresponding one of the opposite planar surfaces of the base plate 1', and a cooling method, it is desirable that the base plate 1' be rotated at 2,000 rpm or less, more preferably at 1,000 rpm or less in the case where the ultraviolet lamp 7 with a water cooling method has a capacity of 80 W/cm and is spaced 5 cm from corresponding one of the opposite planar surfaces of the base plate 1'. Namely, in the case where the base plate 1' is rotated for curing of the coating liquid 4 at speeds greater than those of the spinner operation for producing an excellent coating film having a uniform thickness, problems arise in that the surface roughness of the hard cured coating film becomes large, unevenly cured improper material is left on the peripheral portions of the base plate 1', etc.

Meanwhile, it is desirable that each of the ultraviolet lamps 7 is provided so that the central axis of each of the ultraviolet lamps 7 may be deviated from the central axis of the base plate 1' and more preferably, be disposed between the central axis of the base plate 1' and peripheral edges of the base plate 1'.

It is to be noted here that the plastic plates 1 employed in the present invention should be transparent optically and be capable of fully transmitting light in the range of between 800 nm and 900 nm to be used in the present invention.

Furthermore, as examples of the coating liquid 4, the coating compositions disclosed in the above described U.S. Patent Applications can be utilized.

Hereinbelow, effects of the both-sided coating according to the present invention will be described in comparison with conventional one-sided coating with reference to Table 1 setting forth the experimental data therefor.

The experiments were conducted under the following conditions:

The coating liquid 4 having a viscosity of 16 cps at 25° C. was coated on the base plate 1' while rotating the base plate 1' at 50 rpm. The spinner speed was selected as a parameter. Curing by the use of ultraviolet rays was performed for 60 sec. while rotating the base plate 1' at 150 rpm. The plastic plates 1 made of acrylic resin have a diameter of 210 mm.

TABLE 1

| Embodiment | Spinner speed (rpm) | Coating | Film thickness ($\mu$) | Distortion ($\mu$) |
| --- | --- | --- | --- | --- |
| Comparative example 1 | — | One-sided | 30 | 200 |
| Comparative example 2 | 150 | One-sided | 5 | 100 |
| Comparative example 3 | 1800 | One-sided | 2 | 50 |
| Embodiment 1 | 150 | Both-sided | 5 | 10 |
| Embodiment 2 | 1800 | Both-sided | 2 | 5 |

It should be noted here that distortions in Table 1 are deviations of the peripheral edges of the base plate 1' measured after completion of curing of the coating liquid, from a reference central axis and a reference plane of the base plate 1' in the initial state.

As is clear from the foregoing, the both-sided coating of the present invention is of a far greater industrial value than the conventional one-sided coating in view of effects such that the distortion of the base plate is restricted to a minimum and a cured coating film having a uniform thickness can be obtained.

In accordance with the present invention, the following three steps i.e., wherein the coating liquid is simultaneously applied to opposite planar surfaces of the base plate while rotating the base plate, then the spinner operation is performed thus making uniform the thickness of the coating films and thereafter, ultraviolet rays are irradiated onto the coating films for curing the coating films while rotating the base plate, are conducted continuously. Namely, in accordance with the present invention, the coating liquid application process, spinner operation process, and ultraviolet irradiation process are conducted continuously without stopping rotation of the base plate, whereby the disc having the coating film of a uniform thickness and a minimum distortion can be provided.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:
1. A disc coating method comprising the steps of:
    (1) mounting a disc made of resin on a shaft for rotating said disc in a vertical position and thereafter, simultaneously applying coating liquid to opposite surfaces of said disc while rotating said disc at a first velocity;
    (2) removing unnecessary coating liquid applied to the opposite surfaces of said disc therefrom while rotating said disc at a second velocity greater than said first velocity; and
    (3) simultaneously curing the coating liquid applied to the opposite surfaces of said disc by simultaneously irradiating light energy thereon while rotating said disc at a third velocity greater than said first velocity but less than said second velocity.
2. The disc coating method as claimed in claim 1, wherein said steps (1) to (3) are conducted continuously without stopping rotation of said disc.

3. The disc coating method as claimed in claim 2, wherein the coating liquid is an ultraviolet-curable paint which provides a hard cured coating film having a hardness higher than that of said disc, to be formed on the opposite surfaces of said disc.

4. The disc coating method as claimed in claim 3, wherein the average thickness of the hard cured coating film formed on the opposite surfaces of said disc ranges from 2 to 5 μm.

5. The disc coating method as claimed in claim 2, wherein the average thickness of the hard cured coating film formed on the opposite surfaces of said disc ranges from 2 to 5 μm.

6. The disc coating method as claimed in claim 1, wherein the coating liquid is an ultraviolet-curable paint which provides a hard cured coating film having a hardness higher than that of said disc, to be formed on the opposite surfaces of said disc.

7. The disc coating method as claimed in claim 6, wherein the average thickness of the hard cured coating film formed on the opposite surfaces of said disc ranges from 2 to 5 μm.

8. The disc coating method as claimed in claim 1, wherein the average thickness of the hard cured coating film formed on the opposite surfaces of said disc ranges from 2 to 5 μm.

9. The disc coating method according to claim 1, wherein the disc is made of an acrylic resin having a diameter of about 210 mm.

10. The disc coating method according to claim 1, wherein an acrylic disc is optically transparent and capable of transmitting light in the range of 800 to 900 nm.

11. A disc coating method comprising at least the steps of:
 (1) mounting a disc made of resin on a shaft for rotating said disc in a vertical position and thereafter, simultaneously applying coating liquid to opposite surfaces of said disc while rotating said disc at a first velocity of not greater than 200 rpm;
 (2) removing unnecessary coating liquid applied to the opposite surfaces of said disc therefrom while rotating said disc at a second velocity of 1,000 to 2,000 rpm; and
 (3) simultaneously curing the coating liquid applied to the opposite surfaces of said disc by simultaneously irradiating light energy thereto while rotating said disc at a third velocity of not greater than 1,000 rpm.

12. The disc coating method as claimed in claim 11, wherein said steps (1) to (3) are conducted continuously without stopping rotation of said disc.

13. The disc coating method as claimed in claim 12, wherein the coating liquid is an ultraviolet-curable paint which provides a hard cured coating film having a hardness higher than that of said disc, to be formed on the opposite surfaces of said disc.

14. The disc coating method as claimed in claim 13, wherein the average thickness of the hard cured coating film formed on the opposite surfaces of said disc ranges from 2 to 5 μm.

15. The disc coating method as claimed in claim 12, wherein the average thickness of the hard cured coating film formed on the opposite surfaces of said disc ranges from 2 to 5 μm.

16. The disc coating method as claimed in claim 11, wherein the coating liquid is an ultraviolet-curable paint which provides a hard cured coating film having a hardness higher than that of said disc, to be formed on the opposite surfaces of said disc.

17. The disc coating method as claimed in claim 16, wherein the average thickness of the hard cured coating film formed on the opposite surfaces of said disc ranges from 2 to 5 μm.

18. The disc coating method as claimed in claim 11, wherein the average thickness of the hard cured coating film formed on the opposite surfaces of said disc ranges from 2 to 5 μm.

19. The disc coating method according to claim 11, wherein the disc is made of an acrylic resin having a diameter of about 210 mm.

20. The disc coating method according to claim 11, wherein an acrylic disc is optically transparent and capable of transmitting light in the range of 800 to 900 nm.

* * * * *